United States Patent [19]

Toyama

[11] Patent Number: 5,313,741
[45] Date of Patent: May 24, 1994

[54] METHOD OF AND AN APPARATUS FOR SLICING A SINGLE CRYSTAL INGOT USING AN ID SAW SLICING MACHINE THEREIN

[75] Inventor: Kohei Toyama, Fukushima, Japan

[73] Assignee: Shin-Etsu Handotai Co., Ltd., Japan

[21] Appl. No.: 759,541

[22] Filed: Sep. 13, 1991

[30] Foreign Application Priority Data

Sep. 14, 1990 [JP] Japan .................................. 2-242440

[51] Int. Cl.$^5$ ........................ B24B 49/16; B28D 1/04
[52] U.S. Cl. .............................. 51/165.77; 51/165.87; 51/73 R; 125/13.02
[58] Field of Search ..................... 125/13.01, 13.01, 12, 125/15, 11.18; 51/59 SS, 165.77, 73 R, 5 D, 165.87

[56] References Cited

U.S. PATENT DOCUMENTS

| | | | |
|---|---|---|---|
| 4,228,782 | 10/1980 | Demers et al. | 125/13.02 |
| 4,653,361 | 3/1987 | Zobeli | 51/165.77 |
| 4,991,475 | 2/1991 | Malcok et al. | 125/13.02 |
| 5,000,156 | 3/1991 | Honda et al. | 125/11.18 |
| 5,025,593 | 6/1991 | Kawaguchi et al. | 125/13.02 |

FOREIGN PATENT DOCUMENTS

| | | | |
|---|---|---|---|
| 0269997 | 6/1988 | European Pat. Off. | 125/13.02 |
| 3611937 | 10/1987 | Fed. Rep. of Germany | 51/356 |
| 0133634 | 8/1982 | Japan | 125/13.01 |
| 0199359 | 9/1987 | Japan | 51/5 D |
| 0134212 | 5/1990 | Japan | 125/12 |
| 0121769 | 5/1991 | Japan | 51/165.74 |

Primary Examiner—Robert A. Rose
Attorney, Agent, or Firm—Whitham & Marhoefer

[57] ABSTRACT

An improved method of using an ID saw slicing machine for slicing a single crystal ingot in a direction normal to the axis of the ingot to obtain wafers, of which the improvement lies in that the cutting load which the blade of the ID saw slicing machine imposes upon the single crystal ingot is continually detected in terms of three vector elements along three mutually perpendicular directions throughout the slicing operation, and that, when the magnitude of that vector element of the cutting load which extends in the slicing direction exceeds a predetermined value, the feed rate of the ingot to the blade is decreased and, at the same time, the rotational speed of the blade is increased in accordance with a predetermined control pattern.

14 Claims, 2 Drawing Sheets

METHOD OF AND AN APPARATUS FOR SLICING A SINGLE CRYSTAL INGOT USING AN ID SAW SLICING MACHINE THEREIN

The present invention relates to a method of and an apparatus for slicing a single crystal ingot in a direction normal to the axis of the ingot to thereby obtain thin wafers using an ID saw slicing machine provided therein.

BACKGROUND OF THE INVENTION

An ID saw slicing machine is a slicing machine equipped with a thin doughnut-shaped blade with the inner edge coated with a hard material such as diamond powder. This machine is particularly useful in slicing a brittle rod such as a single crystal semiconductor ingot. As the blade of the ID saw slicing machine is rotated at a high speed, either the ingot or the slicing machine is slid in a manner such that the inner edge of the doughnut-shaped blade crosses the ingot in a direction normal to the axis of the ingot.

In the technical field of semiconductor wafer manufacturing, a silicon single crystal pulled up in a conventional single crystal pulling apparatus is sliced with an ID saw slicing machine (hereinafter also referred to as "an ID slicer") in a direction normal to the axis of the ingot, and a number of thin silicon semiconductor wafers are cut out. However, after a long use, the diamond-powdered grinder edge of the blade of the ID slicer wears and is covered with a densified cut powder layer and thereby starts wobbling roughly; this causes a sliced wafer to have a so-called bow to a greater degree, which is a warp of the wafer in one direction. The bow is attributable to the residual stress in the wafer.

In order to solve this problem, some of the commercially available ID slicers are equipped with a displacement gauge which measures the wobble displacement of the blade of the slicer. The wobbling amount of the blade is detected by means of the displacement gauge, and based on the result of the detection, the blade is appropriately dressed and trued; also the feed rate of the ingot is modified in response to the result of the detection of the blade displacement in a feed back manner. Thus, efforts have been made in an attempt to obtain semiconductor wafers having as small a bow as possible.

However, in the conventional slicing method and apparatus, when the single crystal ingot to be sliced has a large diameter, as the current trend makes this situation more common, the inner diameter of the ID slicer has to be likewise increased, and the greater the inner diameter of the ID slicer, the harder it is to minimize the bow of the semiconductor wafer, since the greater inner diameter of the ID slicer results in greater wobbling of the slicer blade.

Also, since the wobble displacement of the blade is by nature very small in magnitude, it is a difficult task to control and remove the bow of the semiconductor wafer through a feed back manner based on the wobble displacement measurement. Therefore, a need continues to exist for an improved method and apparatus that can reduce even the infinitesimal bow from the wafers.

The present invention was made in view of these problems, and it is an object of the invention to provide a method of using an ID slicer for slicing a single crystal ingot into wafers in which the amount of bow is reduced, and also to provide a slicing apparatus for effecting this method.

SUMMARY OF THE INVENTION

In order to attain the above object and others the present inventor proposes an improvement in a method of using an ID slicer having a blade which is rotated at high speeds for slicing (cutting) a single crystal ingot in a direction normal to the axis of the ingot to obtain wafers, the improvement comprising that the cutting load which the blade of the ID slicer imposes upon the single crystal ingot is continually detected in terms of three vector elements along three mutually perpendicular directions including the cutting direction as one of them throughout the slicing operation, and that, when the magnitude of that vector element of the cutting load which extends in the cutting direction exceeds a predetermined value, the feed rate of the ingot to the blade is decreased and, at the same time, the rotational speed of the blade is increased in accordance with a predetermined control pattern.

In this connection the inventor also proposes an apparatus for carrying out the above improved method which apparatus comprises—in addition to a conventional ID slicer for slicing a single crystal ingot in a direction normal to the axis of the ingot, a drive means for rotating the blade of the ID slicer at a constant speed, a means for measuring the wobble displacement of the blade of the ID slicer, a dressing means for dressing the grinder edge of the ID slicer, a shift means for shifting either the body consisting of the ID slicer and the drive means or the single crystal ingot in a manner such that the ingot is caused to be sliced in the direction normal to its axis—a piezoelectric load detector for detecting the cutting load which the single crystal ingot receives in terms of three vector elements along three mutually perpendicular directions including the slicing direction, and a control means for controlling the shift means and drive means, respectively, in a manner such that, when the magnitude of that vector element of the cutting load which extends in the slicing direction exceeds a predetermined value, the feed rate of the ingot to the blade is decreased and, at the same time, the rotational speed of the blade is increased in accordance with a predetermined control pattern.

In general, the load or cutting resistance which a slicing blade receives from a single crystal ingot being cut increases proportionately with the feed rate of the ingot; that is, the load the ingot receives from the blade increases in proportion to the increase in the feed rate. Also, when the blade saw of the ID slicer is covered with a densified cut powder layer, not only the cutting efficiency is lowered but also the cutting resistance increases; in order to avoid this inconvenience, the rotational speed is increased so that not only the cutting efficiency increases but also the blade saw can easily get rid of the cut powder layer and consequently the cutting resistance is reduced.

Thus, because the cutting load can be kept low, the cutting resistance imposed on the blade of the ID slicer is maintained at a low value and the wobbling of the blade can be minimum and, consequently, it is possible to obtain a wafer with reduced warp or bow.

According to the invention, the cutting load the single crystal ingot receives from the cutting operation of the ID slicer is detected in terms of three vector elements along the three mutually perpendicular directions, which are the direction of cutting (slicing), the direction vertical to the direction of cutting in the plane of the blade, and the direction of the axis of the single crystal ingot; when the detected value of the magnitude of that vector element of the cutting load in the cutting direction exceeds a predetermined value, the feed rate of the ingot is reduced and, at the same time, the rotational speed of the blade of the ID slicer is increased whereby it is possible to keep the cutting resistance at a relatively low value and thus the wobbling of the blade is kept minimum, and consequently the resulting wafers have minimum warp or bow. Therefore, according to the present invention, not only the small magnitude of the displacement of the wobbling blade of the ID slicer is detected, the cutting load imposed on the single crystal ingot is detected, and in response to a detected value of the cutting load, as well as the wobble displacement of the blade, the feed rate and the rotational speed of the ID slicer are controlled, so that the cutting resistance imposed on the blade is maintained low whereby it is possible to keep the wobbling of the blade infinitesimal and obtain wafers with slightest bow.

BRIEF DESCRIPTION OF THE DRAWINGS

The manner in which the foregoing and other objects of this invention are accomplished will be apparent from the accompanying specification and claims considered together with the drawings, wherein:

Figure 1:
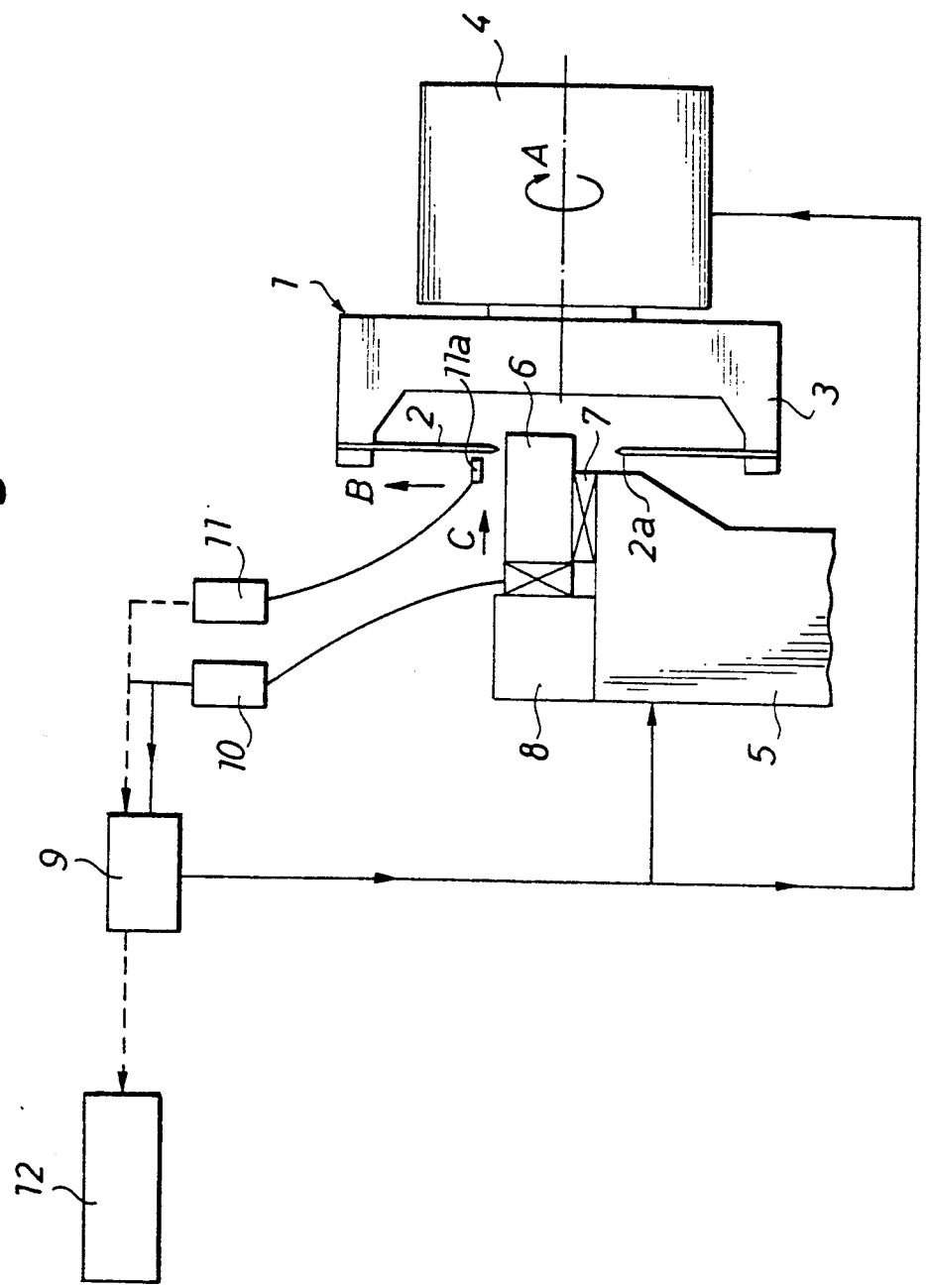
FIG. 1 is a schematic drawing showing the construction of the slicing apparatus of the invention.

With reference to the attached drawings, an embodiment of the invention will be described.

Firstly, with reference to FIG. 1, the basic construction of a slicing apparatus of the invention will be explained. Reference numeral 1 designates an ID slicer which mainly consists of a thin ring blade 2, a drum-like main spindle head 3, and a motor 4. The outer edge of the blade 2 is embedded and fixed in the peripheral portion of the main spindle head 3; the blade 2 is held vertically and in coaxial alignment with the main spindle head 3, which is fixedly supported about the output shaft of the motor 4. The inner circumference of the blade 2 is formed with grinder edge 2a consisting of diamond powder.

In the vicinity of this ID slicer 1 is provided a feeder unit 5 which serves as an ingot mount as well. A cylindrical single crystal silicon ingot 6 to be sliced is placed horizontally on a piezoelectric component 7, which 7 propagates a vibration to the single crystal silicon ingot 6. Also mounted on the feeder unit 5 is an ingot slider unit 8 for displacing the single crystal silicon ingot 6 in the direction indicated by the arrow C to thereby feed the ingot to the ID slicer. A controller 9 as the control means is electrically connected to the motor 4 and the feeder unit 5.

The slicing apparatus further comprises a piezoelectric load detector 10 for detecting the cutting load imposed on the single crystal ingot 6 as it is sliced, a displacement gauge 11 for detecting the wobble displacement of the blade 2 of the ID slicer 1, and a dressing unit 12 for effecting dressing of the grinder edge 2a of the blade 2; these are electrically connected to the controller 9. Incidentally, a probe 11a of the displacement gauge 11 is positioned in the close proximity of the grinder edge 2a of the blade 2.

Figure 3:
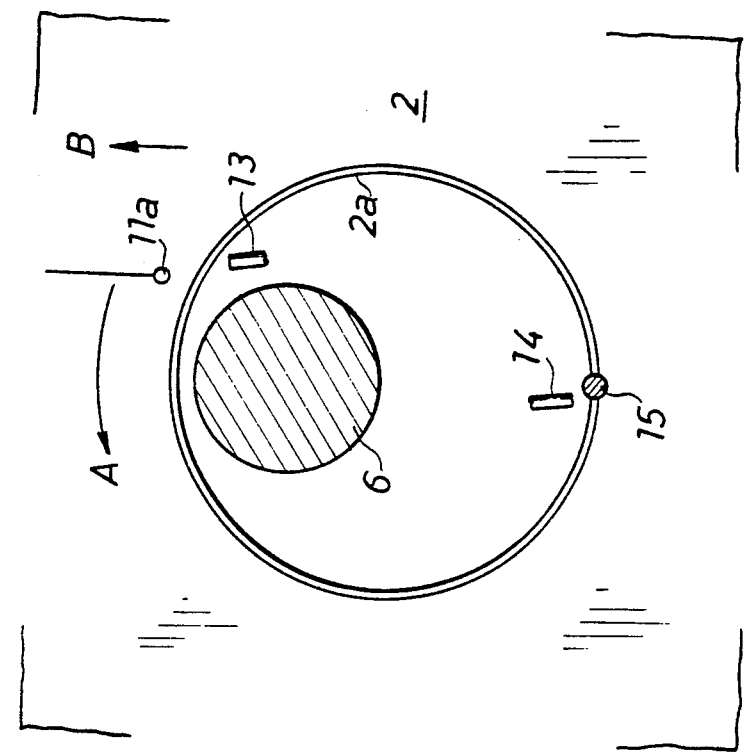
FIG. 3 is a cross section taken on the one-dot chain line III—III of FIG. 2.
Figure 2:
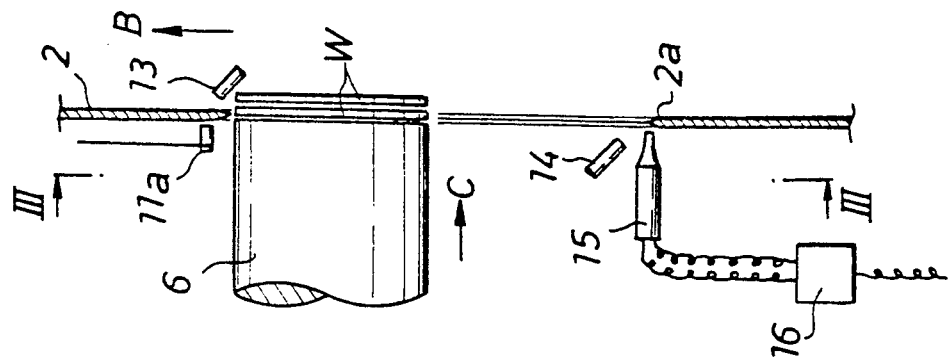
FIG. 2 is a side view of the same slicing apparatus showing only the selected parts thereof.

Also, as shown in FIGS. 2 and 3, in the vicinity of the grinder edge 2a of the blade 2 are provided a jet nozzle 13 to eject cooling liquid, a jet nozzle 14 to eject washing liquid, and a vibrator 15 for propagating an ultrasonic vibration to the washing liquid ejected from the jet nozzle 14. The vibrator 15 is driven by an ultrasonic oscillator 16.

Thus, as the motor 4 is started and its shaft is rotated as shown in FIG. 1, the ID slicer 1, directly connected to the shaft of the motor 4, is rotated in the same direction at a predetermined rate. Then, the ingot slider unit 8 displaces the single crystal silicon ingot 6 in the direction indicated by the arrow C by a predetermined amount whereby the front end portion of the ingot 6 crosses the hole defined by the inner circumference of the blade 2 of the ID slicer 1, as shown in FIG. 1. Meanwhile, the single crystal ingot 6 is caused to vibrate at an appropriate frequency by means of the piezoelectric component 7.

Next, the feeder unit 5 is driven to shift the single crystal ingot 6 together with the ingot slider 8 in the direction indicated by the arrow B of FIG. 1 whereby the single crystal ingot 6 is cut by the grinder edge 2a of the blade 2 in the direction opposite to the arrow B, which is normal to the axis of the ingot 6. The vertical shifting of the ingot in the direction B is continued until a thin disk-shaped silicon semiconductor wafer W is completely severed from the ingot 6. Thereafter, the feeder unit 5 is driven in the direction opposite to the direction B to shift back to the original position; at the same time the ingot slider unit 8 again urges the single crystal ingot 6 to shift in the direction C by the predetermined amount, which determines the thickness of the wafer W, so that the front end portion of the ingot 6 again enters the hole defined by the grinder edge 2a of the blade 2. The same procedure as described above is repeated to slice the wafers W one after another off the ingot 6.

During this slicing operation, the cooling liquid and the washing liquid are continuously ejected from the jet nozzles 13 and 14, respectively, at the grinder edge 2a of the turning blade 2. The grinder edge 2a is thus kept cooled and washed by these liquids, and since the washing liquid ejected from the jet nozzle 14 is given an ultrasonic vibration by the vibrator 15 driven by the ultrasonic oscillator 16 the washing efficiency is extremely high.

Also during this slicing operation, the cutting load imposed on the single crystal ingot 6 by the blade 2 is detected by the piezoelectric load detector 10; the wobble displacement of the blade 2 of the ID slicer 1 is detected by the displacement gauge 11 (by means of the probe 11a). The data thus detected of the cutting load and the wobble displacement are inputted to the controller 9. Incidentally, the cutting load imposed on the single crystal ingot 6 is directly detected by the piezoelectric load detector 10 in a manner such that the cutting load is measured in terms of three vector elements along the three mutually perpendicular directions X, Y and Z. The direction X is the direction of cutting (opposite to the direction of feeding); the direction Y is the direction vertical to the direction of cutting in the plane of the blade; the direction Z is the direction of the axis of the single crystal ingot 6.

Generally, the cutting resistance imposed by the single crystal ingot 6 being sliced is in proportion to the feed rate; thus, the greater the feed rate the greater the cutting load imposed on the ingot 6. When the grinder edge 2a of the blade 2 of the ID slicer 1 is covered with a densified cut powder layer, the absolute value of the cutting load imposed on the ingot 6 increases; on such occasions, the rotational speed of the ID slicer 1 is increased so that the blade saw can smoothly get rid of the cut powder and consequently the load resistance is reduced.

By thus restricting the absolute value of the cutting load imposed on the single crystal ingot 6 to a small value, it is possible to minimize the load resistance imposed on the blade 2 of the ID slicer 1 so that the wobble displacement of the blade 2 becomes smaller and the resulting semiconductor wafer W has slighter bow.

In this embodiment of the invention, the feed rate of the ingot and the rotational speed of the ID slicer 1 are chosen as the control parameters; thus, these control parameters are continually modified in a feedback manner in response to the detected values of the cutting load imposed on the single crystal ingot 6.

In particular, when the magnitude of that vector element of the cutting load which is imposed on the single crystal ingot 6 in the slicing direction, as detected by the piezoelectric load detector 10 and supplied to the controller 9, exceeds a predetermined value, the controller 9 supplies a control signal to the feeder unit 5 and the motor 4 to thereby cause the feed rate to decrease and the rotational speed of the ID slicer 1 to increase. Then, for the reasons stated above, it is possible to minimize the cutting load imposed on the single crystal ingot 6, and, thus, the cutting resistance imposed on the cutting blade 2 of the ID slicer 1 can also be kept small, so that the wobble displacement of the blade 2 is restrained to a small degree. As a result, it is possible to obtain semiconductor wafers W which have slighter face bows.

For example, in this embodiment, when the single crystal ingot having a 5-inch diameter was sliced in the slicing apparatus, the controller 9 had been prearranged such that the feed rate was decreased by 20% and the rotational speed of the ID slicer 1 was increased by 10% when the magnitude of said vector element of the cutting load exceeded 15 kg; as the result, it was possible to continuously slice off about 300 wafers which had bows of 10 μm or smaller.

Also in this embodiment, the piezoelectric component 7 kept giving a vibration of an appropriate frequency and a small amplitude to the single crystal ingot 6 throughout the slicing operation, so that the vibration of the single crystal ingot 6 propagated itself to the blade 2 of the ID slicer 1 and thus the blade 2 also vibrated weakly at the same frequency as the ingot 6; as the result of this resonance between the blade 2 and the ingot 6, the cutting resistance imposed on the blade 2 was weakened and, consequently the slicing occurred smoothly and the thus sliced wafers were found to have still smaller bows.

In particular, in this embodiment, when the single crystal ingot 6 having a 6-inch diameter was sliced, the piezoelectric component 7 was caused to give the single crystal ingot 6 a vibration of which the frequency and the amplitude were 200-2000 Hz and 10-40 μm, respectively; as a result, it was possible to reduce the cutting load imposed on the single crystal ingot 6 by 20-30%. Also, it was confirmed that the effect of reducing the cutting load was greater when the vibration given to the single crystal ingot 6 had a relatively high frequency and a relatively low amplitude.

Furthermore, in this embodiment, since an ultrasonic vibration was given to the washing liquid as it was ejected from the jet nozzle 14, the washing efficiency was increased, and, as the result, not only the grinder edge 2a of the blade 2 of the ID slicer 1 but also the entire body of the ID slicer 1 was kept cleaner so that it took a longer time before the cut powder could clog the grinder edge 2a and, therefore, the cutting load was maintained low for a prolonged period of time.

In particular, when an ultrasonic vibration having a frequency of 20-40 Hz was propagated to the washing liquid, the entire surface of the blade 2 was kept as clean as when it was brand-new till the end of its physical life. An SEM observation of the grinder edge 2a of the blade 2 indicated that virtually no silicon cut powder was clogging the grinder edge 2a.

However, no matter how well the above measures may be applied, it is unavoidable for the grinder edge 2a of the blade 2 to wear and eventually break, so that it is necessary to conduct dressing on the grinder edge 2a at regular intervals.

Thus, in this embodiment, it was arranged such that each time a predetermined number of wafers W were sliced off the single crystal ingot 6, the sum of the three vector elements of the cutting load of the three directions X, Y and Z was calculated in the controller 9 and when the magnitude of the resulting vector, that is, the absolute value of the cutting load, exceeded a predetermined value, the controller 9 outputted a control signal to the dressing unit 12 to thereby control the unit 12 such that an automatic dressing of which the details (manner) are determined responsive to the cutting load value and the direction of the wobble displacement of the blade 2 detected by the displacement gauge 11, was conducted on the grinder edge 2a of the blade 2. In particular, each time fifty wafers W were sliced off the single crystal ingot 6, it was determined whether or not the magnitude of the cutting load exceeded 15 kg, and if the answer was affirmative, that portion of the grinder edge 2a which was pointed in the opposite direction from the direction of the wobble displacement detected by the displacement gauge 11, was dressed for a period of ten seconds or shorter. As a result, it was possible to slice off about 1000 wafers W of 6-inch diameter on end. Through employment of such an automatic dressing operation, it would be possible to arrange no-man line for the entire wafer slicing operation.

As is clear from the above description, according to the invention, the cutting load imposed on the single crystal ingot is detected during the slicing operation, and when the detected value exceeds a predetermined value, the feed rate of the ingot is decreased and, at the same time, the rotational speed of the ID slicer is increased; so that it is now possible to maintain the cutting load, or the load resistance imposed on the blade of the ID slicer, to a small value, and consequently the wobble displacement of the blade of the ID slicer is minimized and the resulting wafers will have slighter bows.

While there have been described preferred forms of the invention, obviously modifications and variations are possible in light of the above teachings. It is therefore to be understood that within the scope of the appended claims, the invention may be practiced otherwise than as specifically described.

What is claimed is:

1. An improved method of using an ID saw slicing machine having a blade which is rotated at high speeds for slicing a single crystal ingot in a direction normal to the axis of the ingot to obtain wafers, wherein the cutting load which the blade of the ID saw slicing machine imposes upon the single crystal ingot is continually detected in terms of three vector elements along three mutually perpendicular directions including said slicing direction throughout the slicing operation, and that, when the magnitude of that vector element of the cutting load which extends in the slicing direction exceeds a predetermined value, the feed rate of the ingot to the blade is decreased and, at the same time, the rotational speed of the blade is increased in accordance with a predetermined control pattern.

2. The method as claimed in claim 1, wherein said single crystal ingot being sliced is kept vibrating at a frequency near a resonant frequency of said single crystal ingot and said blade.

3. The method as claimed in claim 1, further characterized by that each time a predetermined number of wafers have been sliced off the single crystal ingot, the magnitude of the sum of the three vector elements of the cutting load imposed on the single crystal ingot is calculated, and, when this magnitude exceeds a predetermined value, an automatic dressing operation is applied to that portion of a grinder edge of the blade which is pointed in a direction opposite to a direction of wobble displacement, for a time period determined responsive to the magnitude of the cutting load value.

4. An apparatus for slicing a single crystal ingot having an ID saw slicing machine for slicing the single crystal ingot in a direction normal to the axis of the ingot, a drive means for rotating a blade of the ID saw slicing machine at a constant speed, a means for measuring wobble displacement of the blade of the ID saw slicing machine, a dressing means for dressing the grinder edge of the ID saw slicing machine, and a shift means for shifting either the body consisting of the ID saw slicing machine the drive means or the single crystal ingot in a manner such that the ingot is caused to be sliced in the direction normal to its axis, a piezoelectric load detector for detecting the cutting load the single crystal ingot receives in terms of three vector elements along three mutually perpendicular directions including said slicing direction, and a control means for controlling the shift means and drive means, respectively, in a manner such that, when the magnitude of that vector element of the cutting load which extends in the slicing direction exceeds a predetermined value, the feed rate of the ingot to the blade is decreased and, at the same time, the rotational speed of the blade is increased in accordance with a predetermined control pattern.

5. The apparatus as claimed in claim 4, further comprising a piezoelectric element for propagating a vibration of a frequency near a resonant frequency of said single crystal ingot and said blade to said single crystal ingot.

6. The apparatus as claimed in claim 4, further comprising a jet nozzle for ejecting a washing liquid to the grinder edge of the blade of the ID saw slicing machine and an oscillator for propagating an ultrasonic vibration to said washing liquid as the liquid is ejected from said jet nozzle.

7. The apparatus as claimed in claim 4, characterized by that said controller further controls said dressing means in a manner such that, each time a predetermined number of wafers have been sliced off the single crystal ingot, said controller calculates the magnitude of the sum of the three vector elements of the cutting load imposed on the single crystal ingot, and, when this magnitude exceeds a predetermined value, said dressing means is caused to apply an automatic dressing to that portion of grinder edge of the blade which is pointed in the direction opposite to the direction of the wobble displacement detected by said wobble displacement measuring means for a time period determined responsive to the magnitude of the cutting load value.

8. A method as claimed in claim 2, wherein each time a predetermined number of wafers have been sliced off the single crystal ingot, the magnitude of the sum of the three vector elements of the cutting load imposed on the single crystal ingot is calculated, and, when this magnitude exceeds a predetermined value, an automatic dressing operation is applied to that portion of grinder edge of the blade which is pointed in the direction opposite to the direction of the wobble displacement, for a time period determined responsive to the magnitude of the cutting load value.

9. The apparatus as claimed in claim 5, said controller wherein controls said dressing means in a manner such that, each time a predetermined number of wafers have been sliced off the single crystal ingot, said controller calculates the magnitude of the sum of the three vector elements of the cutting load imposed on the single crystal ingot, and, when this magnitude exceeds a predetermined value, said dressing means is caused to apply an automatic dressing to that portion of grinder edge of the blade which is pointed in the direction opposite to the direction of the wobble displacement detected by said wobble displacement measuring means for a time period determined responsive to the magnitude of the cutting load value.

10. The apparatus as claimed in claim 6, wherein said controller further controls said dressing means in a manner such that, each time a predetermined number of wafers have been sliced off the single crystal ingot, said controller calculates the magnitude of the sum of the three vector elements of the cutting load imposed on the single crystal ingot, and, when this magnitude exceeds a predetermined value, said dressing means is caused to apply an automatic dressing to that portion of grinder edge of the blade which is pointed in the direction opposite to the direction of the wobble displacement detected by said wobble displacement measuring means for a time period determined responsive to the magnitude of the cutting load value.

11. The method as claimed in claim 1, wherein said single crystal ingot being sliced is kept vibrating at a frequency in the range of 200 Hz to 2000 Hz.

12. The method as claimed in claim 2, wherein said single crystal ingot being sliced is kept vibrating at a frequency in the range of 200 Hz to 2000 Hz.

13. The apparatus as claimed in claim 4, further comprising a piezoelectric element for propagating a vibration in the frequency range of 200 Hz to 2000 Hz to said single crystal ingot.

14. The apparatus as claimed in claim 5, wherein said piezoelectric element propagates a vibration in the frequency range of 200 Hz to 2000 Hz to said single crystal ingot.

* * * * *